(No Model.) 2 Sheets—Sheet 1.
G. S. RIGGS.
APPARATUS FOR ASSORTING ORANGES.
No. 363,084. Patented May 17, 1887.
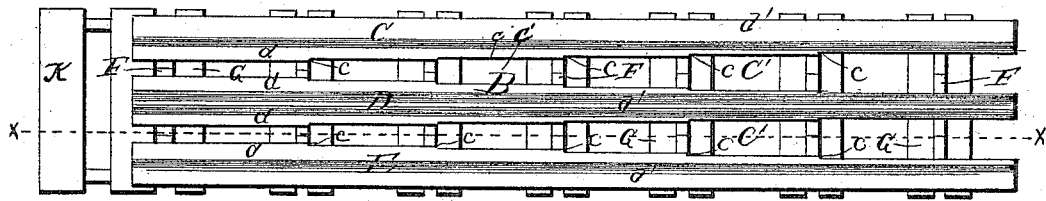
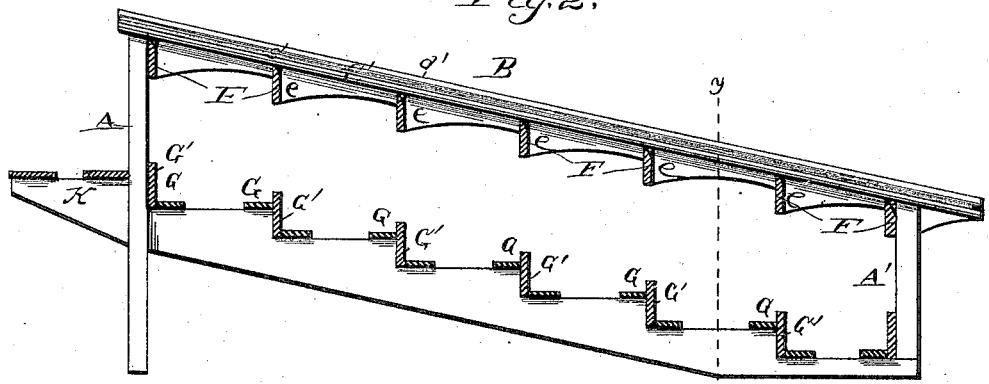
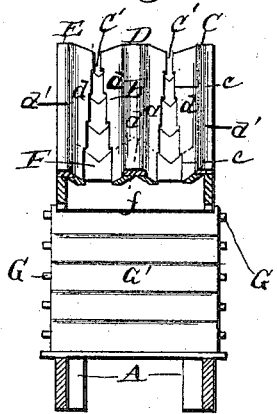
Witnesses
Chas L. Taylor
Inventor
Geo. S. Riggs
By his Attorneys (No Model.) 2 Sheets—Sheet 2.
G. S. RIGGS.
APPARATUS FOR ASSORTING ORANGES.
No. 363,084. Patented May 17, 1887.
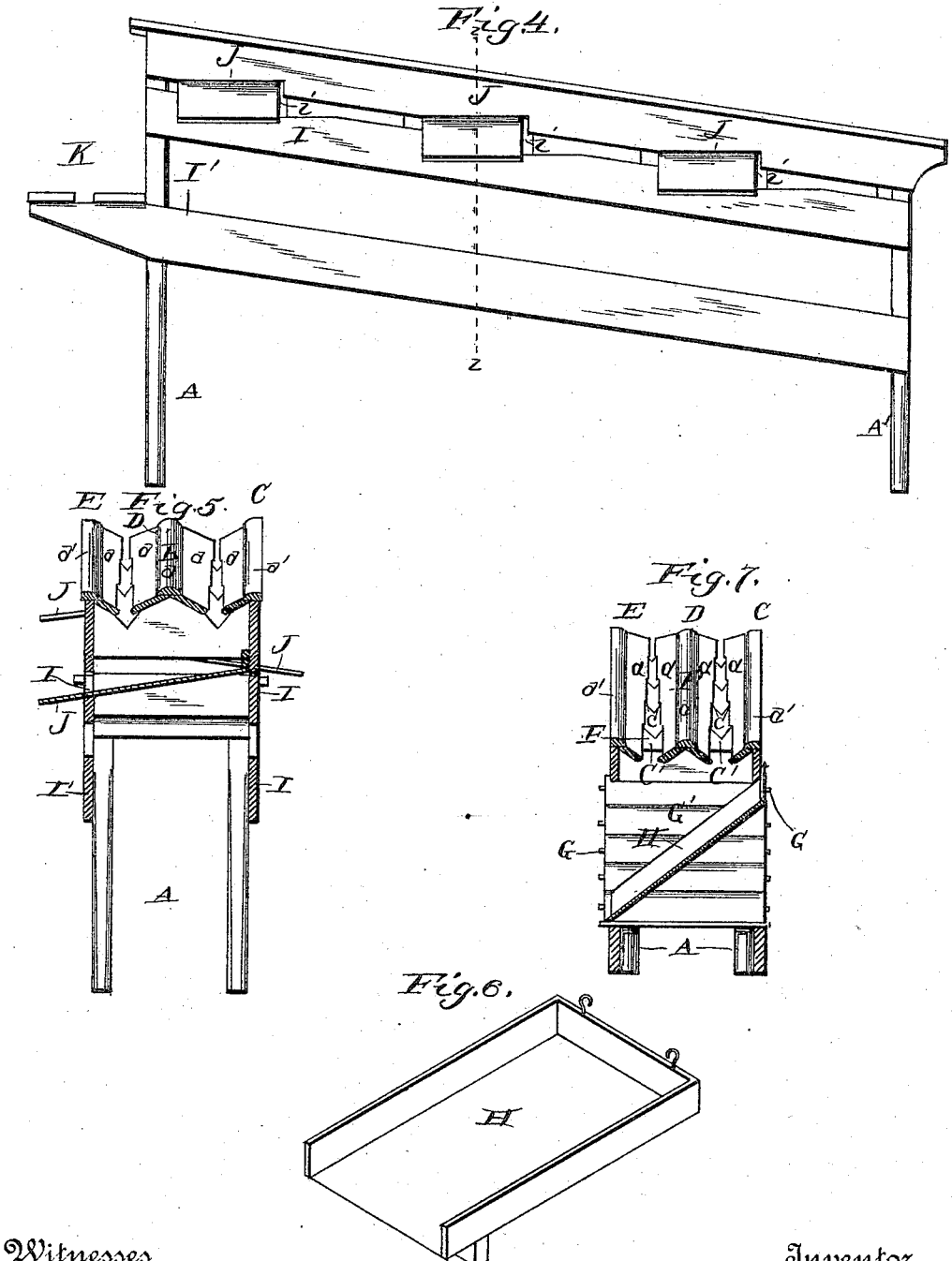

UNITED STATES PATENT OFFICE.

GEORGE SMITH RIGGS, OF MICANOPY, FLORIDA.

APPARATUS FOR ASSORTING ORANGES.

SPECIFICATION forming part of Letters Patent No. 363,084, dated May 17, 1887.

Application filed August 13, 1886. Serial No. 210,798. (No model.)

*To all whom it may concern:*

Be it known that I, GEORGE SMITH RIGGS, a citizen of the United States, residing at Micanopy, in the county of Alachua and State of Florida, have invented new and useful Improvements in Apparatus for Assorting Oranges, of which the following is a specification.

My invention relates to improvements in apparatus for assorting oranges and other substances; and it consists of the peculiar combination and novel construction and arrangement of the various parts, substantially as hereinafter fully set forth, and particularly pointed out in the claims.

The object of my invention is to provide an apparatus of the class named by which the oranges and other fruits or substances will be very easily and rapidly assorted without requiring any adjustment on the part of the attendant, who merely feeds or supplies the apparatus with the fruit or substance to be assorted.

A further object of my invention is to provide means for delivering the fruit or substance to suitable receptacles or vessels, and for effectually discharging them from the apparatus without danger of improperly directing their discharge or course away from the receptacle, and to provide such an apparatus that shall possess superior advantages in points of simplicity, strength, and durability of construction and cheapness in the manufacture.

In the accompanying drawings, which illustrate an apparatus for assorting oranges and other substances embodying my invention, Figure 1 is a top plan view. Fig. 2 is a longitudinal sectional view on the line $x\,x$ of Fig. 1. Fig. 3 is a vertical transverse sectional view on the line $y\,y$ of Fig. 2. Fig. 4 is a side elevation of another form of my invention. Fig. 5 is a transverse sectional view on the line $z\,z$ of Fig. 4. Fig. 6 is a detail view of one of the trays, and Fig. 7 is a transverse sectional view corresponding to Fig. 3, showing the said tray adjusted for use as a deflector to discharge the assorted substances to one side of the machine into suitable receptacles.

Referring to the drawings, in which like letters of reference denote corresponding parts in all the figures, A A' designate the uprights or vertical standards, which are arranged in pairs at each end of a top, B, of which my improved assorting apparatus consists. These uprights are of different heights, so that the top is arranged at an angle to the floor, or in an inclined position, with one end higher than the other, and the top is composed of two or more sections, C D, although I have shown three in the accompanying drawings, the last one of which I have lettered E. These top sections are arranged parallel with each other, are inclined in the same plane or direction, and arranged a short distance from each other, so as to provide intermediate spaces or openings, C', through which the fruit or other substance falls, in order to discharge from the proper point in the apparatus. These inclined top sections are provided on their edges with cut-out or cut-away portions $c$, which are of different widths from their upper to their lower ends, so as to provide a series of openings or spaces which are of different widths. Thus the space C' at the extreme upper end of the top is very narrow to discharge very small fruit, the next opening a little wider to discharge larger fruit, the next one is still wider, and so on throughout the series, until at the extreme lower end of the incline the space or opening is very wide to discharge large fruit, as will be readily understood.

The inclined top sections are beveled on their opposing sides, as at $d$, which incline in reverse directions, and thus provide ways or troughs on which the fruit rolls as it passes along the inclined top to the openings through which it is discharged, and the top sections have upwardly-projecting ribs or flanges $d'$ at the middle, so that the fruit cannot pass over the sides of the trough or from one trough to the other, as is obvious.

In the drawings, the central top section, D, is beveled on both of its sides in the reverse direction to the opposing sides of the sections C E on opposite sides thereof. It will thus be seen that in order to assort the oranges or other fruit it is only necessary for the operator to place the same upon the device at the elevated end thereof, and the fruit will then roll down the inclined or beveled sides of the top sections and be retained thereby in the troughs formed by the same until they come to the discharge-openings C' of the proper size, through which they drop or fall by gravity into the proper vessels or receptacles provided therefor, as will be more fully described presently. The fruit is thus assorted without requiring the operator or attendant to adjust or manipulate any of the parts of the apparatus, but only to feed them thereto, and the operation of assorting is rapidly and efficiently carried out.

F designates a series of transverse partitions or walls, which are arranged beneath the top sections at the lowermost extremities of the discharge-openings C' immediately beneath the notches or shoulders c, formed by cutting away the side edges of the top sections, as hereinbefore described. The function of these partitions, at the lower extremities of the discharge-openings of varying sizes, is to arrest the downward progress of the fruit after it has passed into the proper opening and prevent it from passing into the succeeding openings C', and thus obviate the danger of the fruit of one size falling into the receptacle or vessel provided for the fruit of a larger size. The side sections, C E, of the top B have depending flanges e, against which the partitions bear, and are secured in place by suitable means which enter the flanges, and the upper edges of the partitions are cut away to form the projecting portions f, that fit snugly against the lower sides of the inclined top sections, as shown.

G designates a series of steps or platforms arranged one lower than the other and all equidistant from the inclined top B, and at one end of each of the steps is affixed a vertical abutment, G', that projects above the plane of the step to which it is secured, to serve as guides for the removable trays H in placing them upon or withdrawing them from the steps or platforms.

The trays H are of any suitable or desired form and size, preferably rectangular, as shown, and they are supported by the steps or platforms immediately beneath the discharge-openings C' in the table-top, so that the fruit falling through the openings will drop into the tray provided therefor. The trays merely rest upon the steps or platforms, and are readily removable therefrom when they have become filled, or for other purposes, and the vertical abutments form guides for the tray in placing them on the steps and in removing them from the same. The trays can be supported wholly by the platforms and be held thereby in a horizontal position; or they may be arranged in an inclined position, as shown in Fig. 7 of the drawings, to adapt them for service as deflecting partitions or boards. One end of the tray is left open for this purpose, and the opposite end is provided with hooks or eyes, which engage or connect with suitable devices on one side of the apparatus to support the upper end of the tray or deflector in place, while the lower end thereof rests upon the step or platform, so as to guide and discharge the fruit beyond the edge of the step, and, without coming in contact therewith, to adapt it to fall into suitable receptacles at the side or sides of the apparatus.

The partitions can be inclined in either direction transversely across the inclined top, or all in one direction, or part in one direction and part in the other, and they are detachably connected to the top, so that they can be adjusted into horizontal positions to serve as trays.

The trays or deflectors can be made of any suitable or preferred material—wood, metal, part metal and wood, or wood with a screen or sieve bottom, or otherwise—and they may, if preferred, be provided with a handle on their under side to adapt them to be easily grasped, said handle also serving to limit the inward movement of the trays when they are placed upon the platforms or steps.

In Figs. 4 and 5 of the drawings I have shown another form of my invention. The inclined sectional top, with the discharge-openings of varying sizes, is employed in this form in substantially the same condition as heretofore described; but, in lieu of the horizontal and convertible trays with the series of steps, I make the deflectors rigid, and thus form them a part of the frame.

The uprights in this device are connected and braced by suitable rails, I I', the upper of which, I, are provided with a series of inclined cut-out portions, i, upon which rest the outer ends of the inclined partitions J, that are arranged transversely of the device. The inclined partitions are arranged in opposite or reverse directions to direct the fruit of two adjoining openings, C', to opposite sides of the apparatus and into suitable receptacles placed on the floor or other place beneath the outer extremities of the said partitions. The inner elevated ends of the inclined transverse partitions are secured in any suitable manner to the sides of the top sections, as will be readily understood.

The operation of my invention will be readily understood from the foregoing description, taken in connection with the accompanying drawings, and I will not therefore append a detailed description of the same to this specification.

K designates a shelf or support that is either rigidly or detachably connected to the uprights A of the frame of the apparatus at the higher or elevated end of the table thereof, and the fruit or other substance, in vessels, is placed upon this shelf so as to be within convenient reach of the attendant who feeds the fruit to the apparatus.

My invention is very simple and strong in construction, effective and reliable in operation, performs its duties very rapidly and without requiring any attention on the part of the operator, and is cheap and inexpensive of manufacture.

Having thus fully described my invention, what I claim as new, and desire to secure by Letters Patent, is—

1. An apparatus for assorting fruit, comprising an inclined trough having openings of different sizes therein, a series of steps arranged beneath the trough, and a series of deflectors, each having closed sides and ends and each detachably connected at the closed end to one side of the trough and resting at the other end upon a step, said deflectors being adapted to rest in a horizontal position upon the steps to thereby serve as trays, as and for the purpose described.

2. An apparatus for assorting fruit, comprising an inclined trough formed of three or more parallel sections, the middle or intermediate section having a series of notches in both of its side edges, and each of the outer sections having a like series of notches on its inner side only, and thereby forming a series of openings of varying widths, a series of transverse partitions permanently secured beneath the trough at the lower ends of the openings therein, a series of steps, and a series of inclined deflectors, each detachably connected at its upper end to one side of the trough and resting at its other end upon a step, each of said deflectors adapted to assume a horizontal position on one of the steps and thereby serve as a tray, as and for the purpose set forth.

In testimony that I claim the foregoing as my own I have hereto affixed my signature in presence of two witnesses.

GEORGE SMITH RIGGS.

Witnesses:
 J. W. SMITH,
 S. H. BENJAMIN.